April 30, 1963   K. O. HEINTZ ET AL   3,088,094
SEISMIC RECORDING
Filed June 23, 1958   2 Sheets-Sheet 1
FIG. 1.
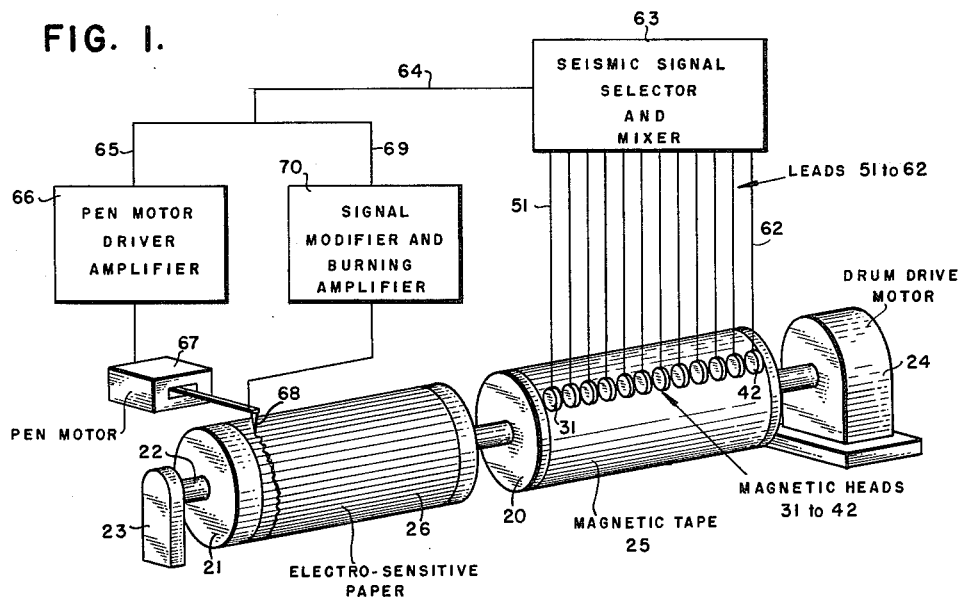
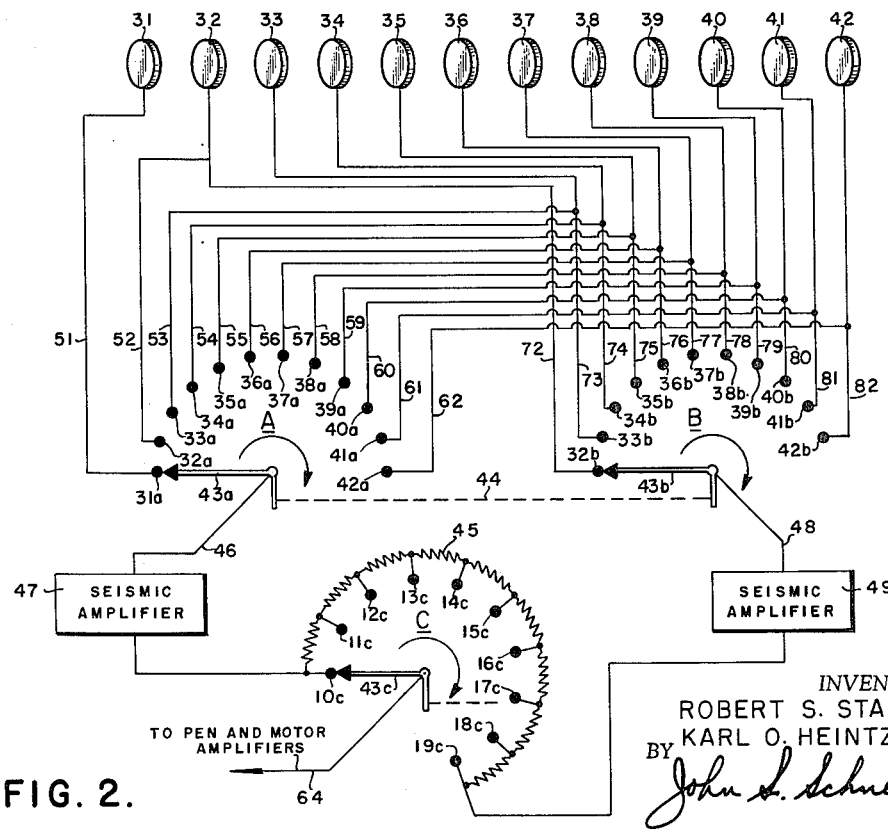
FIG. 2.
INVENTORS.
ROBERT S. STANLEY,
KARL O. HEINTZ,
BY John L. Schneider
ATTORNEY.

INVENTORS.
ROBERT S. STANLEY,
KARL O. HEINTZ,
BY
*John S. Schneider*
ATTORNEY.

United States Patent Office 3,088,094
Patented Apr. 30, 1963

3,088,094
SEISMIC RECORDING
Karl O. Heintz and Robert S. Stanley, Houston, Tex., assignors, by mesne assignments, to Jersey Production Research Company, Tulsa, Okla., a corporation of Delaware
Filed June 23, 1958, Ser. No. 743,535
7 Claims. (Cl. 346—74)

This invention is directed to method and apparatus for recording seismic information. In its more particular aspects the invention is directed to providing improved method and apparatus for presenting seismic signals visually by combining "wiggly trace" and "variable density trace" type presentations. The invention also encompasses methods and apparatus for compositing the various traces of a seismogram originally recorded in reproducible form, as on a magnetic medium.

As is well-known in geophysical prospecting, a seismic disturbance is imparted to the earth generally by means of an explosion. Seismic waves generated by the explosion travel downwardly through the subsurface and are reflected back to the surface by subterranean strata. These reflected waves are detected at spaced points on the earth's surface, which points are at selected distances from the explosion point, termed "the shot point." The depth of subsurface reflecting strata can be determined by measuring the time intervals between initiation of the explosion and detection of the reflected waves at the detection point. Various corrections may be made to adjust the arrival time of the reflected waves to compensate, for example, for differences in the elevation of the shot point and the various detecting points and to compensate for the low velocity layer of the earth at the several points.

Electrical signals are generated in response to the seismic wave energy and these signals may be recorded in various ways such as, photographically or electromagnetically. An electro-magnetic record is not visual; however, it is readily adapted to reproduction. When such a record is reproduced or played-back, the various time corrections mentioned above may be applied to the signals making up the record. This type record can be repeatedly reproduced.

The reflected waves picked up by any one of the detectors are of varying amplitudes and so the electrical signal put out by the detector is also of varying amplitudes. This signal when recorded visually without any change in form gives the conventional or "wiggly trace" type recording. This signal, when recorded visually in a variable density type presentation, is displayed as a straight line, the density of which varies in proportion to the signal amplitude. The signal can be more effectively presented by presenting it in combined "wiggly trace" and "variable density trace" form. The variable density presentation employs a moving electro-sensitive paper and an electric stylus. A record line is burned into the paper by an electric spark discharge from the stylus through the paper to a ground electrode behind the paper which may be the drum on which the paper is arranged.

Thus, an object of this invention is to provide method and apparatus for effecting an improved seismic presentation.

This and other objects of the invention will be apparent from a description of the invention which follows:

The method of the invention comprises, briefly, visually recording traces of electrical signals produced in response to seismic waves, the excursion of the trace from the mean value and the density of the trace both varying in proportion to the amplitude of the electrical signal. The electrical signals are preferably selectively fed from a multichannel magnetic recorder to a single trace type recorder. With this arrangement the method invention may include the additional step of mixing two or more of the signals from the magnetic recorder prior to feeding the signals to the single trace recorder.

The apparatus of the invention comprises a multichannel magnetic record, a plurality of magnetic reproducing head means arranged adjacent said magnetic record, a visual record means, a recording means adapted to form a visual record on said visual record means, said magnetic record and said magnetic head means being movable relative to each other for reproducing each of said magnetic record channels in the form of electrical signals, said visual record means and said recording means being movable relative to each other for recording said electrical signals, said recording means including means which moves in response to changes in amplitudes of said electrical signals and means for varying the density or intensity of the recording in response to variations in amplitudes of said electrical signals, and means connecting in a parallel circuit said magnetic head means to said means for varying movement of said movable recording means and to said means for varying the intensity of the recording.

Preferably, the visual recording means is electro-sensitive paper and the recording means preferably includes a movable electric pen or stylus. One parallel connection interconnects the magnetic head means and a coil of a pen motor connected to the pen. The other parallel connection interconnects the magnetic head means and the pen. An amplifier may be connected in the one parallel connection for amplifying the electrical signal fed to the pen motor and a burning amplifier may be connected in the other parallel connection for amplifying the electrical signal fed to the pen. A signal modifier may be employed in this latter connection. The signal modifier may full-wave rectify the signal, or half-wave rectify it, or produce pulses corresponding to the zero-crossings of the signal, etc. Hence the presentation of the signal on the electro-sensitive paper may be varied depending on the type signal modifier that operates on the signal fed to the pen.

The apparatus may be arranged to include a selector whereby each magnetic channel is sequentially connected to the pen motor and pen. The apparatus may also include a compositor in place of the selector whereby the seismic signals fed from two or more magnetic channels are mixed prior to being fed to the pen motor and the pen.

For a more complete description of the invention reference is now made to the figures wherein:

FIG. 1 is a schematic illustration showing the arrangement of apparatus employed in the present invention;

FIG. 2 is a schematic illustration showing in detail the seismic signal selector and mixer of FIG. 1.

Figure 3:
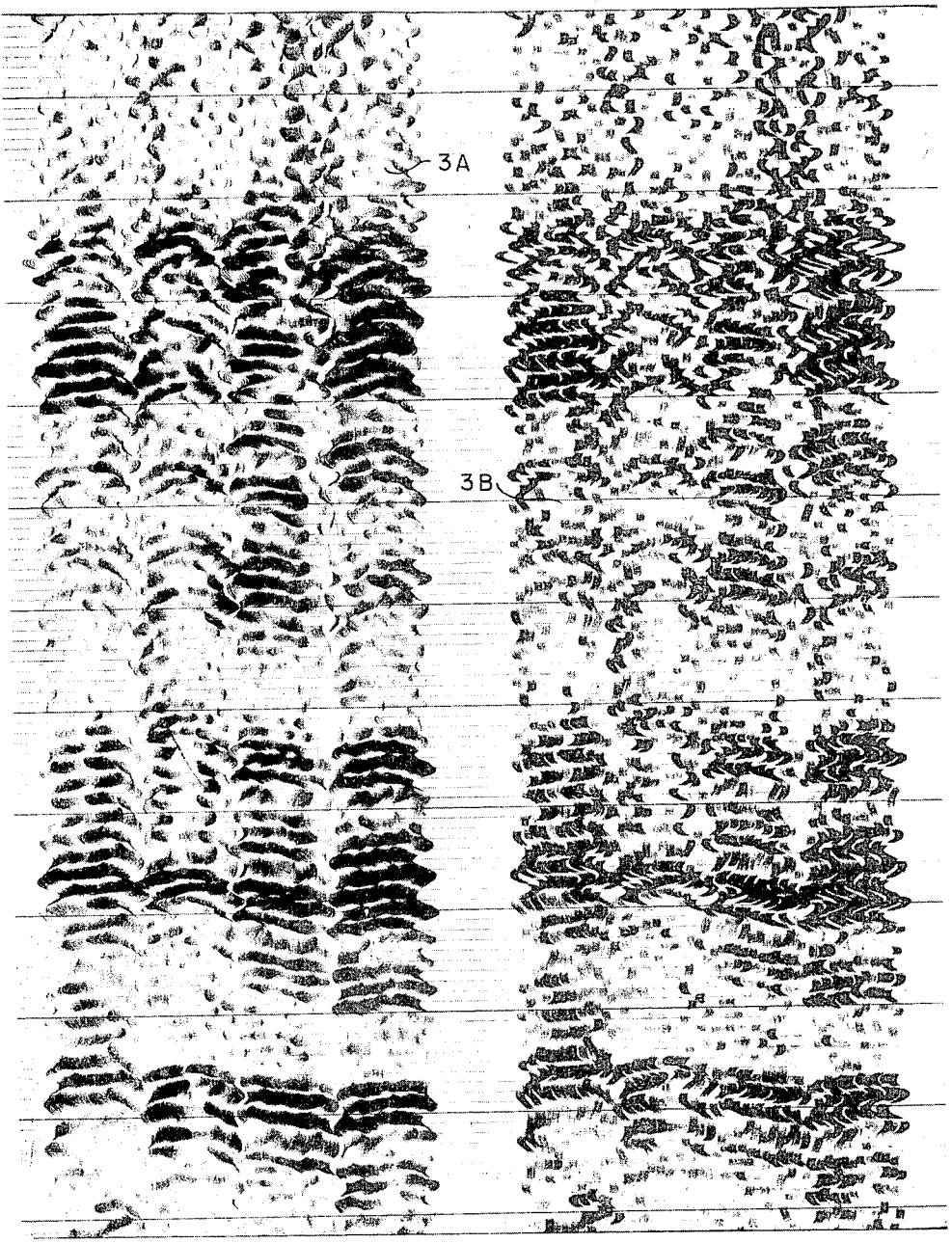
FIG. 3 illustrates representative records obtained through the use of the method and apparatus of the invention.

Referring to the drawings in greater detail wherein identical numerals designate identical parts, in FIG. 1 are shown spaced-apart rotatable drums 20 and 21 arranged on a rotatable shaft 22 which is supported at one end 23 and driven at the other end by drive motor 24. A magnetic tape 25 is arranged on drum 20 and electro-sensitive paper 26 is arranged on drum 21. A plurality of magnetic channels are formed on magnetic tape 25. A plurality of magnetic heads 31 through 42, one for each magnetic channel, are positioned adjacent magnetic tape 25. A plurality of electrical conductors or leads 51 through 62 connect magnetic heads 31 through 42, respectively, to a seismic signal selector 63 which may include a mixer described in greater detail with regard to FIG. 2. Electrical conductors 64 and 65 connect selector 63 to an amplifier 66 which, in turn, is connected to the coil of a pen motor 67. A pen 68 is attached to pen motor 67. Movement of pen 68 is responsive to the amount of energization of the coil of pen motor 67. Electrical conductors 64 and 69 connect selector 63 to an amplifier 70 which, in turn, is connected directly to pen 68. This circuit may include a signal modifier, previously mentioned, which may be a full-wave rectifier, a half-wave rectifier, etc.

The selector and integrator 63 is more clearly seen in FIG. 2. The mixer includes three selector elements designated A, B, and C. Selector A is provided with a plurality of contacts 31a through 42a; selector B is provided with a plurality of contacts 32b through 42b; and selector C is provided with a plurality of contacts 10c through 19c. Selectors A, B, and C are also provided with selector contact arms 43a, 43b, and 43c, respectively.

Magnetic heads 31 through 42 connect to contacts 31a through 42a, respectively, of selector A through electrical conductors 51 through 62, respectively. Magnetic heads 32 through 42 connect to contacts 32b through 42b, respectively, of selector B through conductors 72 through 82, respectively. Selectors A and B are interconnected for sequential automatic operation as indicated by dashed line 44. Between contacts 10c through 19c of selector C are arranged a plurality of resistances 45. Selector A connects to contact 10c of selector C through a conductor 46 to which is connected an amplifier 47. Selector B connects to contact 19c of selector C through a conductor 48 to which is connected an amplifier 49. Conductor 64 feeds the mixed electrical signal from selector C to the parallel circuits through conductors 65 and 69, as shown in FIG. 1.

Selectors A, B, and C are arranged and interconnected such that contact arm 43c moves to the successive contacts on selector C upon each revolution of the drum, whereas contact arms 43a and 43b move to a new contact on each ten revolutions of the drums. Pen motor 67 is designed to move across the length of drum 21; and upon each revolution of the drums, the pen motor 67 and pen 68 will be moved a small amount in order to form a fresh or new trace on the electro-sensitive paper. As an example of the operation, consider the switching cycle beginning with contacts 43a, 43b, and 43c at contact positions 31a, 32b, 10c, respectively, as shown in FIG. 2. As the drum continues to rotate, contact arm 43c will move successively to contacts 11c, 12c, etc., upon successive rotations of the drum. When arm 43c reaches contact 19c, it returns to contact 10c in preparation for another cycle. At that time, contact arms 43a and 43b move to contact points 32a and 33b, respectively, thereby feeding the signals on channels 32 and 33 to selector C. Therefore, contact arm 43a moves successively from contact 31a to contact 32a to contacts 33a, etc., until contact 42a is reached and contact arm 43b moves similarly until contact 42b is reached; then these arms return to their original positions in contact with contacts 31a and 32b. Rotation of the drums is then stopped and the next magnetic record is placed on drum 20 for play-back and re-recording in the manner just described. It is seen that when re-recorded in this manner, a 12-trace seismogram may result in 120 traces in the final recording. For most effective visual presentation, these traces are recorded at close proximity to each other as will be evident with reference to FIG. 3.

This arrangement of equipment mixes channels 31 through 42 in varying ways and amounts. For example, in FIG. 2 with the contact arms, as shown, zero percent of channel 32 is mixed with 100 percent of channel 31. When arm 43c moves to contact 11c then 10 percent of channel 32 is mixed with 90 percent of channel 31, etc. After channels 31 and 32 have been mixed in ten different ratios, channels 32 and 33 will be similarly mixed, and then channels 33 and 34 will be mixed, etc.

This illustrates one manner of compositing the signals. Other mixing arrangements are possible and are to be considered as within the scope of this invention.

In operation an explosive is detonated at the shot point and the resultant seismic waves travel downwardly and are reflected from a reflecting subsurface stratum. Spaced geophones pick up the seismic waves at the surface of the earth and translate them into electrical signals, which are conducted to amplifiers and filters. The amplified and filtered electrical signals are then placed on a magnetizable surface such as magnetic tape 25, which is arranged on reproducing or play-back drum 20.

When it is desired to record on burning drum 21, shaft 22 is rotated by means of drum drive 24, which, in turn, rotates magnetic tape drum 20 and burning drum 21 in unison. The signals from the magnetic channels are transmitted through seismic signal selector 63. The mixed signal from selector 63 is fed to pen motor 67 through conductors 64 and 65 and amplifier 66. The signal causes pen 68 to form a "wiggly trace" on the electro-sensitive paper 26. The mixed signal from the selector 63 is fed also to pen 68 through conductors 64 and 69 and signal modifier and burning amplifier 70. This signal varies the intensity of the aforesaid "wiggly trace" formed on the electro-sensitive medium. The magnetic channels are mixed in varying proportions in accordance with the above description relative to FIG. 2. Pen motor 67 is mounted on a lead screw, not shown, which moves the pen motor slightly along the length of drum 21 upon each revolution of the burning drum.

If the mixer is not employed, then selector A alone may be used which arrangement will record each channel separately without mixing as contact arm 43a moves to the various contact positions.

A typical group of records obtained by compositing the signals is shown at 3A in FIG. 3 and a typical group of records obtained without compositing the signals is shown at 3B in FIG. 3.

The burning voltage signal is preferably modified in order to enhance the variable density presentation. The electrical signal fed to pen 68 is preferably full-wave rectified by the signal modifier 70. Alternatively, other forms of burning voltage may be used ranging from D.C. to voltages for presenting positive (or negative) zero-crossing pulses.

The electrical circuits for the signal modifier and compositor mechanism and other equipment have not been shown since these circuits are conventional and well-known.

Instead of the burning drum type seismic presentation a photographic type presentation may be utilized. In this type of presentation the intensity of the light which is projected onto a light sensitive medium varies in proportion to the amplitude of the voltage signal. The "wiggly trace" is formed by use of conventional galvanometer mirrors.

Having fully described the operation, objects, method and apparatus of the invention, we claim:

1. Seismic recording apparatus comprising a multi-channel magnetic record of electrical signals generated in response to seismic wave energy, a plurality of reproducing magnetic head means arranged adjacent said magnetic record, a visual record means, a recording means adapted to form a visual record on said visual record means, said magnetic record and said magnetic head means being movable relative to each other for reproducing each of said magnetic record channels in the form of electrical signals, said visual record means and said recording means being movable relative to each other for recording said electrical signals, said recording means including means for varying movement of said recording means in response to variations in amplitude of said electrical signals and means for varying the intensity of the recording in response to variations in amplitude of said electrical signals and an electrical circuit including means connecting in parallel said magnetic head means to said means for varying movement of said recording means and to said means for varying the intensity of the recording.

2. Apparatus as recited in claim 1 wherein the visual record means comprises electro-sensitive paper and said recording means comprises a movable pen motor and an electric stylus connected thereto, said electrical circuit including one connection interconnecting said magnetic head means and said pen motor and another connection interconnecting said magnetic head means and said electrosensitive paper through said electric stylus.

3. Apparatus as recited in claim 2 including an amplifier connected in said one connection adapted to amplify said electrical signal fed to said pen motor and an amplifier and a rectifier connected in said other connection adapted to amplify and rectify said electrical signal fed to said pen.

4. Apparatus as recited in claim 3 wherein said rectifier is a full-wave rectifier.

5. Apparatus as recited in claim 4 including a selector adapted to sequentially and separately connect each magnetic channel to said pen motor and pen.

6. Apparatus as recited in claim 5 including a selector and mixer adapted to connect two or more magnetic channels sequentially to said pen motor and pen.

7. Apparatus for use in recording an electrical signal generated in response to seismic wave energy comprising visual record means; a recording means adapted to form a visual record of said electrical signals on said visual record means, said visual record means being movable relative to said recording means and said recording means including means for varying movement of said recording means in response to variations in amplitude of said electrical signals and means in conjunction with said visual record means for varying the intensity of said recording in response to variations in amplitude of said electrical signals.

References Cited in the file of this patent

UNITED STATES PATENTS

| | | |
|---|---|---|
| 2,620,890 | Lee et al. | Dec. 9, 1952 |
| 2,638,402 | Lee | May 12, 1953 |
| 2,714,202 | Downing | July 26, 1955 |
| 2,779,428 | Silverman | Jan. 29, 1957 |
| 2,794,966 | McCarty | June 4, 1957 |
| 2,803,515 | Begun et al. | Aug. 20, 1957 |
| 2,842,220 | Clifford et al. | July 8, 1958 |
| 2,872,996 | Runge | Feb. 10, 1959 |
| 2,876,428 | Skelton et al. | Mar. 3, 1959 |
| 2,877,080 | Eisler | Mar. 10, 1959 |
| 2,882,988 | Dorbrin | Apr. 21, 1959 |
| 2,889,000 | Silverman et al. | June 2, 1959 |
| 2,902,107 | Erath et al. | Sept. 1, 1959 |
| 2,926,249 | Lindsey | Feb. 23, 1960 |
| 2,928,708 | Ellison et al. | Mar. 15, 1960 |
| 2,967,291 | Carlisle et al. | Jan. 3, 1961 |
| 2,998,592 | Wells | Aug. 29, 1961 |
| 3,002,180 | Winterhalter et al. | Sept. 26, 1961 |